(12) United States Patent
Pak

(10) Patent No.: US 12,323,555 B2
(45) Date of Patent: Jun. 3, 2025

(54) METHOD AND SERVER FOR PROVIDING A CALL SERVICE

(71) Applicants: HYUNDAI MOTOR COMPANY, Seoul (KR); KIA CORPORATION, Seoul (KR)

(72) Inventor: Nahyeon Pak, Anyang-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 523 days.

(21) Appl. No.: 17/870,967

(22) Filed: Jul. 22, 2022

(65) Prior Publication Data

US 2023/0031315 A1 Feb. 2, 2023

(30) Foreign Application Priority Data

Jul. 27, 2021 (KR) .................. 10-2021-0098572

(51) Int. Cl.
*H04M 3/42* (2006.01)
*G06Q 50/40* (2024.01)
*H04M 1/724* (2021.01)

(52) U.S. Cl.
CPC ........ *H04M 3/42348* (2013.01); *G06Q 50/40* (2024.01); *H04M 1/724* (2021.01)

(58) Field of Classification Search
CPC ....... H04W 4/029; H04W 4/02; H04W 4/023; H04M 3/42357; H04M 2242/15; H04M 3/42348; H04M 1/72418; H04M 1/72424; H04M 11/007; G06Q 50/40; G01C 21/3438
See application file for complete search history.

(56) References Cited

U.S. PATENT DOCUMENTS

| | | | |
|---|---|---|---|
| 10,387,984 B2 | 8/2019 | Baek | |
| 11,200,586 B2 | 12/2021 | Mitsumaki et al. | |
| 2016/0267618 A1 | 9/2016 | Baek | |
| 2019/0295108 A1 | 9/2019 | Mitsumaki et al. | |
| 2020/0160719 A1* | 5/2020 | Zhang | G08G 1/202 |
| 2021/0142229 A1* | 5/2021 | Young | G06Q 30/0283 |
| 2022/0051272 A1 | 2/2022 | Mitsumaki et al. | |

FOREIGN PATENT DOCUMENTS

| | | |
|---|---|---|
| JP | 2019168827 A | 10/2019 |
| KR | 101725343 B1 | 4/2017 |
| KR | 20190029132 A | 3/2019 |

* cited by examiner

*Primary Examiner* — Allahyar Kasraian
(74) *Attorney, Agent, or Firm* — Lempia Summerfield Katz LLC

(57) ABSTRACT

A method of providing a call service includes: receiving a current location of a first terminal from the first terminal; acquiring information on a time at which the current location is received; acquiring the degree of demand of a vehicle call around the current location; determining whether a call pattern of a user corresponding to the first terminal is stored; determining a vehicle call UI displayed in the first terminal according to the current location, the time, a degree of demand, and existence/non-existence of the call pattern of the user corresponding to the first terminal; and transmitting information about the vehicle call UI to the first terminal.

20 Claims, 12 Drawing Sheets

FIG. 6A

| No. | Use location | Use time | Pattern existence/non-existence | Use environment (degree of demand) | UI |
|---|---|---|---|---|---|
| 1 | Main use place | Main use time | YES | Environment having high degree of demand | - Automatically set as main used destination (provide together with added destination recommendation)<br>- Determine rapid call required situation and display immediate call function |
| 2 | Main use place | Main use time | YES | Environment having low degree of demand | - Automatically set as main used destination (provide together with added destination recommendation)<br>- Determine call situation having time and display direct call function |
| 3 | Main use place | Main use time | NO | Environment having high degree of demand | Recommend destination mainly used by multiple customers (direct select and input)<br>Determine rapid call required situation and display immediate call function |
| 4 | Main use place | Main use time | NO | Environment having low degree of demand | Recommend destination mainly used by multiple customers (direct select and input)<br>Determine call situation having time and display direct call function |
| 5 | Main use place | Not main use time | YES | Environment having high degree of demand | Recommend mainly used destination, and other destinations mainly used in corresponding time zone by multiple customers<br>Determine rapid call required situation and display immediate call function |
| 6 | Main use place | Not main use time | YES | Environment having low degree of demand | Recommend mainly used destination, and other destinations mainly used in corresponding time zone by multiple customers<br>Determine call situation having time and display direct call function |
| 7 | Main use place | Not main use time | NO | Environment having high degree of demand | Recommend destination mainly used in corresponding time zone by multiple customers<br>Determine rapid call required situation and display immediate call function |
| 8 | Main use place | Not main use time | NO | Environment having low degree of demand | Recommend destination mainly used in corresponding time zone by multiple customers<br>Determine call situation having time and display direct call function |

FIG. 6B

| No. | Use location | Use time | Pattern existence/non-existence | Use environment (degree of demand) | UI |
|---|---|---|---|---|---|
| 9 | Not main use place | Main use time | YES | Environment having high degree of demand | Recommend mainly used destination, and other destinations mainly used in corresponding place by multiple customers |
| | | | | | Determine rapid call required situation and display immediate call function |
| 10 | Not main use place | Main use time | YES | Environment having low degree of demand | Recommend mainly used destination, and other destinations mainly used in corresponding place by multiple customers |
| | | | | | Determine call situation having time and display direct call function |
| 11 | Not main use place | Main use time | NO | Environment having high degree of demand | Recommend destination mainly used in corresponding place by multiple customers |
| | | | | | Determine rapid call required situation and display immediate call function |
| 12 | Not main use place | Main use time | NO | Environment having low degree of demand | Recommend destination mainly used in corresponding place by multiple customers |
| | | | | | Determine call situation having time and display direct call function |
| 13 | Not main use place | Not main use time | YES | Environment having high degree of demand | Recommend mainly used destination, and other destinations mainly used in corresponding place/time by multiple customers |
| | | | | | Determine rapid call required situation and display immediate call function |
| 14 | Not main use place | Not main use time | YES | Environment having low degree of demand | Recommend mainly used destination, and other destinations mainly used in corresponding place/time by multiple customers |
| | | | | | Determine call situation having time and display direct call function |
| 15 | Not main use place | Not main use time | NO | Environment having high degree of demand | Recommend destination mainly used in corresponding place/time by multiple customers |
| | | | | | Determine rapid call required situation and display immediate call function |
| 16 | Not main use place | Not main use time | NO | Environment having low degree of demand | Recommend destination mainly used in corresponding place/time by multiple customers |
| | | | | | Determine call situation having time and display direct call function |
| 17 | When user separately sets emergency situation | | | | Determine rapid call required situation |

METHOD AND SERVER FOR PROVIDING A CALL SERVICE

CROSS-REFERENCE TO RELATED APPLICATION

This application claims priority to and the benefit of Korean Patent Application No. 10-2021-0098572 filed in the Korean Intellectual Property Office on Jul. 27, 2021, the entire contents of which are incorporated herein by reference.

BACKGROUND

(a) Field

The present disclosure relates to a method and a server for providing a call service.

(b) Description of the Related Art

In general, a taxi user rides an empty taxi, or calls a taxi through a call center or a calling application, and then rides the allocated taxi. Recently, with the development of the IT technology, taxi calls through a calling application are becoming more frequent.

A taxi user calls a taxi by executing a calling application of a mobile terminal and directly inputting a departure point and a destination, designating a departure point and a destination on a map, or selecting a place pre-stored as a favorite as a departure point and a destination.

Accordingly, in situations such as when the user has to move quickly due to lack of time, an early time or a late time when public transportation is cut off, and the user needs a short-distance travel, the general calling method is cumbersome. Further, information on the destination input by the user is provided to a taxi driver and the driver determines whether to accept the call according to the destination, so that there is a problem in that it is difficult to assign a taxi in response to the taxi call for the destination that the driver does not prefer.

The above information disclosed in this Background section is only for enhancement of understanding of the background, and therefore it may contain information that does not form the prior art that is already known to a person of ordinary skill in the art.

SUMMARY

The present disclosure provides a method and a server for providing a call service, which provide a user with a calling method suitable to a situation.

The present disclosure also provides a method and a server for providing a call service, which recommend a destination to a user.

In addition, the present disclosure provides a method and a server for providing a call service, which are capable of promptly allocating a taxi.

In one embodiment of the present disclosure, a method of providing a call service includes: receiving a current location of a first terminal from the first terminal; acquiring information on a time at which the current location is received; acquiring the degree of demand of a vehicle call around the current location; determining whether a call pattern of a user corresponding to the first terminal is stored; determining a vehicle call user interface (UI) displayed in the first terminal according to the current location, the time, the degree of demand, and existence/non-existence of the call pattern of the user corresponding to the first terminal; and transmitting information about the vehicle call UI to the first terminal.

The determining of the vehicle call UI may include, when the call pattern of the user is stored, the current location is a main use place in which a vehicle call is frequent, the time is a main use time at which the vehicle call is frequent, and the degree of demand is high, determining the vehicle call UI as an immediate call UI in which a mainly used destination of the call pattern is preset as a destination and which includes an object that immediately calls the vehicle.

The determining of the vehicle call UI may include, when the call pattern of the user is stored, the current location is a main use place in which a vehicle call is frequent, the time is a main use time at which the vehicle call is frequent, and the degree of demand is low, determining the vehicle call UI as a direct call UI in which a mainly used destination of the call pattern is preset as a destination.

The determining of the vehicle call UI may include, when the call pattern of the user is stored and the degree of demand is high, determining the vehicle call UI as an immediate call UI which recommends a mainly used destination of the call pattern as a destination and includes an object immediately calling a vehicle.

The determining of the vehicle call UI may include, when the call pattern of the user is not stored and the degree of demand is high, determining the vehicle call UI as an immediate call UI which recommends a mainly used destination of a call pattern of another user similar to the user as a destination and includes an object immediately calling a vehicle.

The determining of the vehicle call UI may include, when the call pattern of the user is stored and the degree of demand is low, determining the vehicle call UI as a direct call UI which recommends a mainly used destination of the call pattern as a destination.

The determining of the vehicle call UI may include, when the call pattern of the user is not stored and the degree of demand is low, determining the vehicle call UI as a direct call UI which recommends a mainly used destination of a call pattern of another user similar to the user as a destination.

The method may further include: receiving a vehicle call according to an input in the vehicle call UI from the first terminal; and requesting allocation of a vehicle according to the vehicle call to at least one second terminal located around the current location.

The call pattern may be generated based on a vehicle call.

The call pattern may include at least one of pattern information according to the day, pattern information according to weather, movement distance pattern information, pattern information according to a type of call place, pattern information according to a call environment, and moving path pattern information determined based on the vehicle call.

In another embodiment of the present disclosure, a server includes: a communication unit; a database configured to store a plurality of call patterns corresponding to a plurality of users; and a controller configured to receive a current location of a first terminal from the first terminal through the communication unit, acquire information on a time at which the current location is received, acquire the degree of demand of a vehicle call around the current location, determine whether a call pattern of a user corresponding to the first terminal is stored in a database, and determine a vehicle call user interface (UI) as an immediate call UI or a direct call UI according to the current location, the time, the degree of demand, and existence/non-existence of the call pattern of the user corresponding to the first terminal.

When the call pattern of the user is stored, the current location is a main use place in which a vehicle call is frequent, the time is a main use time at which the vehicle call is frequent, and the degree of demand is high, the controller may determine the vehicle call UI as an immediate call UI in which a mainly used destination of the call pattern is preset as a destination and which includes an object that immediately calls the vehicle When the call pattern of the user is stored, the current location is a main use place in which a vehicle call is frequent, the time is a main use time at which the vehicle call is frequent, and the degree of demand is low, the controller may determines the vehicle call UI as a direct call UI in which a mainly used destination of the call pattern is preset as a destination.

When the call pattern of the user is stored and the degree of demand is high, the controller may determine the vehicle call UI as an immediate call UI which recommends a mainly used destination of the call pattern as a destination and includes an object immediately calling a vehicle.

When the call pattern of the user is not stored and the degree of demand is high, the controller may determine the vehicle call UI as an immediate call UI which recommends a mainly used destination of a call pattern of another user similar to the user as a destination and includes an object immediately calling a vehicle.

When the call pattern of the user is stored and the degree of demand is low, the controller may determine the vehicle call UI as a direct call UI which recommends a mainly used destination of the call pattern as a destination.

When the call pattern of the user is not stored and the degree of demand is low, the controller may determine the vehicle call UI as a direct call UI which recommends a mainly used destination of a call pattern of another user similar to the user as a destination.

The controller may receive a vehicle call according to an input in the vehicle call UI from the first terminal through the communication unit, and request allocation of a vehicle according to the vehicle call to at least one second terminal located around the current location.

The call pattern may be generated based on a vehicle call.

The call pattern may include at least one of pattern information according to the day, pattern information according to weather, movement distance pattern information, pattern information according to a type of call place, pattern information according to a call environment, and moving path pattern information determined based on the vehicle call.

In still another embodiment of the present disclosure, a program stored in a recording medium performs the method of providing the call service.

In another embodiment of the present disclosure, a recording medium stores a program performing the method of providing the call service.

The method of providing the call service and the server according to the present disclosure have the following effects.

According to at least one of the embodiments of the present disclosure, a user can call a taxi quickly.

According to at least one of the exemplary embodiments of the present disclosure, it is possible to prevent a business vehicle from refusing to take passengers.

According to at least one of the exemplary embodiments of the present disclosure, a user can be assigned a taxi quickly.

According to at least one of the exemplary embodiments of the present disclosure, a user is capable of conveniently using the transportation service.

The additional scope of applicability of the present disclosure should become apparent from the following detailed description. However, it should be understood that the detailed description and specific embodiments, such as the embodiments described below, are given by way of illustration only, since various changes and modifications within the scope of the present disclosure may be clearly understood by those having ordinary skill in the art.

BRIEF DESCRIPTION OF THE DRAWINGS

In order that the disclosure may be well understood, there will now be described various forms thereof, given by way of example, reference being made to the accompanying drawings, in which:

FIGS. 6A and 6B are tables respectively representing a call pattern of the call service providing method according to one embodiment of the present disclosure.

Figure 1:
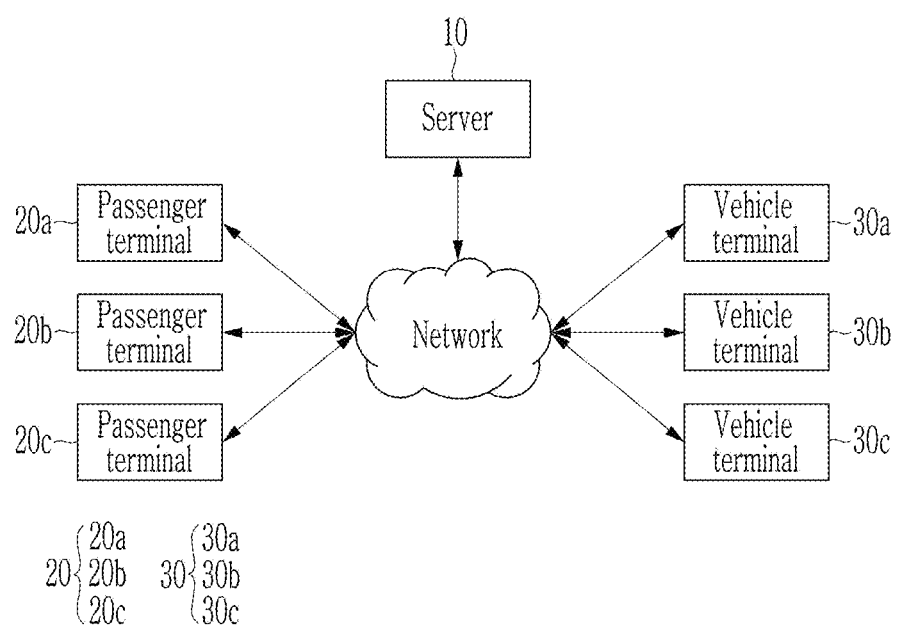
FIG. 1 is a diagram illustrating a call service providing system including a call service providing server according to an embodiment of the present disclosure.

The drawings described herein are for illustration purposes only and are not intended to limit the scope of the present disclosure in any way.

DETAILED DESCRIPTION

Hereinafter, embodiments of the present disclosure are described in detail with reference to the accompanying drawings, and the same or similar constituent element is denoted by the same reference numeral regardless of a reference numeral, and a repeated description thereof will be omitted. Suffixes, "module" and and/or "~unit" for a constituent element used for the description below are given or mixed in consideration of only easiness of the writing of the specification, and the suffix itself does not have a discriminated meaning or role. Also, the terms, such as 'unit' or 'module', etc., should be understood as a unit that processes at least one function or operation and that may be embodied in a hardware manner (e.g., a processor), a software manner, or a combination of the hardware manner and the software manner.

Further, in describing the exemplary embodiment disclosed in the present disclosure, when it is determined that detailed description relating to well-known functions or configurations may make the subject matter of the exemplary embodiment disclosed in the present disclosure unnecessarily ambiguous, the detailed description is omitted. Further, the accompanying drawings are provided for helping to easily understand exemplary embodiments disclosed in the present disclosure, and the technical spirit disclosed in the present disclosure is not limited by the accompanying drawings, and it should be appreciated that the present disclosure includes all of the modifications, equivalent matters, and substitutes included in the spirit and the technical scope of the present disclosure.

Terms including an ordinary number, such as first and second, are used for describing various constituent elements, but the constituent elements are not limited by the terms. The terms are used only to discriminate one constituent element from another constituent element.

It should be understood that when one constituent element is referred to as being "coupled to" or "connected to" another constituent element, one constituent element can be directly coupled to or connected to the other constituent element, but intervening elements may also be present. By contrast, when one constituent element is referred to as being "directly coupled to" or "directly connected to" another constituent element, it should be understood that there are no intervening elements.

In the present disclosure, it will be appreciated that terms "including" and "having" are intended to designate the existence of characteristics, numbers, steps, operations, constituent elements, and components described in the specification or a combination thereof, and do not exclude a possibility of the existence or addition of one or more other characteristics, numbers, steps, operations, constituent elements, and components, or a combination thereof in advance.

When a component, device, element, or the like of the present disclosure is described as having a purpose or performing an operation, function, or the like, the component, device, or element should be considered herein as being "configured to" meet that purpose or to perform that operation or function.

FIG. 1 is a diagram illustrating an example of a call service providing system including a call service providing server in an embodiment of the present disclosure.

The call service providing system includes: a server 10 providing a call service, a passenger terminal 20 that wants to use a call service, and a vehicle terminal 30 mounted on a business vehicle (for example, a taxi and business mobility).

As illustrated, the plurality of passenger terminals 20*a*, 20*b*, and 20*c* communicates with the server 10 through a network. Further, the plurality of vehicle terminals 30*a*, 30*b*, and 30*c* also communicates with the server 10 through the network.

The passenger terminal 20 and the vehicle terminal 30 include mobile terminals. The mobile terminal described in the present specification may include a mobile phone, a smart phone, a laptop computer, a navigation device, an in-vehicle infotainment device, a tablet PC, a ultrabook, a wearable device (for example, a smartwatch, smart glass, and a Head Mounted Display (HMD)), and the like.

Figure 2:
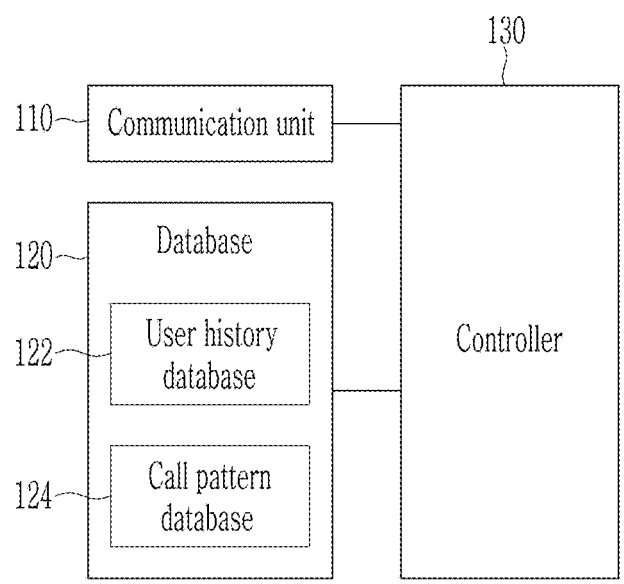
FIG. 2 is a block diagram schematically illustrating the call service providing server of FIG. 1.

FIG. 2 is a block diagram schematically illustrating the call service providing server of FIG. 1. As illustrated, the server 10 includes a communication unit 110, a database 120, and a controller 130.

First, the communication unit 110 may transmit and receive information through a communication network so that the server 10 communicates with the passenger terminal 20 and the vehicle terminal 30. The communication unit 110 may process the received information and output the processed information to the controller 130. Further, the communication unit 110 may transmit the information processed in the controller 130 to the passenger terminal 20 and the vehicle terminal 30 through the communication network.

Next, the database 120 stores information for a call service. The database 120 includes a user history database 122 and a call pattern database 124.

In particular, the user history database 122 stores user information about the plurality of passenger terminals 20 and the plurality of vehicle terminals 30. For example, the user history database 122 stores identification information of a user or a terminal used by the user, such as an identification number, telephone number, a name of a user, a gender, age, address, Identification (ID), password, and an e-mail address, of each terminal, a call history of the user, and the like.

The call history of the user includes information related to a call when there is a call from the passenger terminal 20 of the user. For example, the call history may include information about a call date and time, an allocation date and time, a departure point and a destination, and a degree of demand around the departure point.

The call pattern database 124 includes a call pattern generated based on the call history of the user. For example, the call pattern includes information about a date and time, season, weather, a call place, a call environment, use purpose, moving path, and a movement distance obtained from the call history and the information about the call date and time, the departure point and the destination, and the degree of demand included in the call history.

The call pattern may include pattern information according to the day of the week. For example, the pattern information according to the day of the week includes taxi use rates according to weekdays/weekends.

The call pattern may include pattern information according to season and/or weather. For example, the pattern information according to season and/or weather includes taxi use rates according to temperatures of summer and winter.

The call pattern may include movement distance pattern information. For example, the movement distance pattern information includes a "short-head movement pattern" in the case of a short-distance movement (for example, within 5 km) and a "long-tail movement pattern" in the case of a middle/long distance movement (for example, 20 to 45 km).

The call pattern may include pattern information according to the call place type. For example, the call place type is divided into indoor in a building, alley, boulevard, and others.

The call pattern may include pattern information according to a call environment. For example, the call environment is divided into following cases: a case where there is or is no connected public transportation to the calling place, a case where it takes more than 10 minutes by foot due to the location of the connected public transportation stop or the complexity of the route in the calling place, a case where for the same distance to the calling place, a taxi travel time is 4 to 5 minutes and the movement time by public transportation is 20 minutes, so there is a difference of 10 minutes or more, and a case where an emergency situation occurs and the like.

The call pattern may include moving path pattern information. For example, the moving path includes a path according to the purpose (for example, the path for the purpose of commuting to and from work, the purpose of returning home, and a frequently visited place) according to the information about the departure point and the destination.

One call pattern may include each pattern information. For example, one call pattern includes "weekends, winter, low temperature, alleys, connected public transportation, return to home, return moving path from Gangnam station, the "short-tail" as the pattern information. For another example, one call pattern includes "weekdays, winter, low temperature, alleys, connected public transportation, frequently visited place (Hongdae), frequently visited moving path in the Gangnam station, the "long-tail" as the pattern information.

In addition, the call pattern includes information classified based on various information analyzable from the call history, and is not limited to the foregoing description. The call pattern may be updated according to the accumulation of the call history.

In addition, the database 120 includes three-dimensional location information according to latitude, longitude, and altitude, and address information, map information, road information, building information, and the like corresponding to the location.

Next, the controller 130 may process the input or output signal, data, information, and the like through the foregoing constituent elements.

The controller 130 may generate a message to be transmitted to the passenger terminal 20 or the vehicle terminal 30 by referring to the user history database 122. For example, the controller 130 generates UI information for guiding an expected price to the passenger terminal 20, an acceptance message to be transmitted to the passenger terminal 20 calling the vehicle, a message requesting payment according to an intermediary service, and the like, and generates a request message and route information to be transmitted to the vehicle terminal 30 of the taxi driver accepting the request.

The controller 130 may process conversational message between the terminals 20 and 30, and transmit the processed conversational message to each of the terminals, For example, the controller 130 may transfer the message transmitted from the passenger terminal 20 requesting the taxi call to the vehicle terminal 30.

Further, the controller 130 may store the information about the request for the taxi call in the call pattern database 124. In particular, the controller 130 stores the call pattern generated based on the call history of the user in the call pattern database 124 for each user.

That is, the controller 130 may process the information for relaying the passenger terminal 20 and the vehicle terminal 30 and store the processed information in the database 120.

The function of the controller 130 and the user history database 122 may also be provided in a message server (not illustrated) communicating with the server 10. The message server may process the conversational message between the terminals 20 and 30 and transfer the processed conversational message to each of the terminals. For example, the message server may transfer the message transmitted from the passenger terminal 20 requesting the taxi call to the vehicle terminal 30.

Further, the message server may provide a message application interworking with an application provided by the server 10 to the terminals 20 and 30. For example, when the taxi call is requested through an application installed in the passenger terminal 20, the controller 130 transfers the taxi call request of the passenger terminal 20 to the message server. Then, the message server transmits a message corresponding to the taxi call request to the message application installed in the vehicle terminal 30.

That is, when the taxi call request of the passenger terminal 20 is received in the server 10, the server 10 may transfer the taxi call request to the vehicle terminal 30 via the external message server.

The controller 130 may determine a UI to be provided to the passenger terminal 20 by considering a current location and the call pattern of the passenger terminal 20.

For example, when the current location of the passenger terminal 20 is received, the controller 130 determines a UI to be displayed on the passenger terminal 20 based on the current location and the reception date and time, and the existence/non-existence of the call pattern of the user of the passenger terminal 20.

Next, the passenger terminal is described with reference to FIG. 3.

Figure 3:
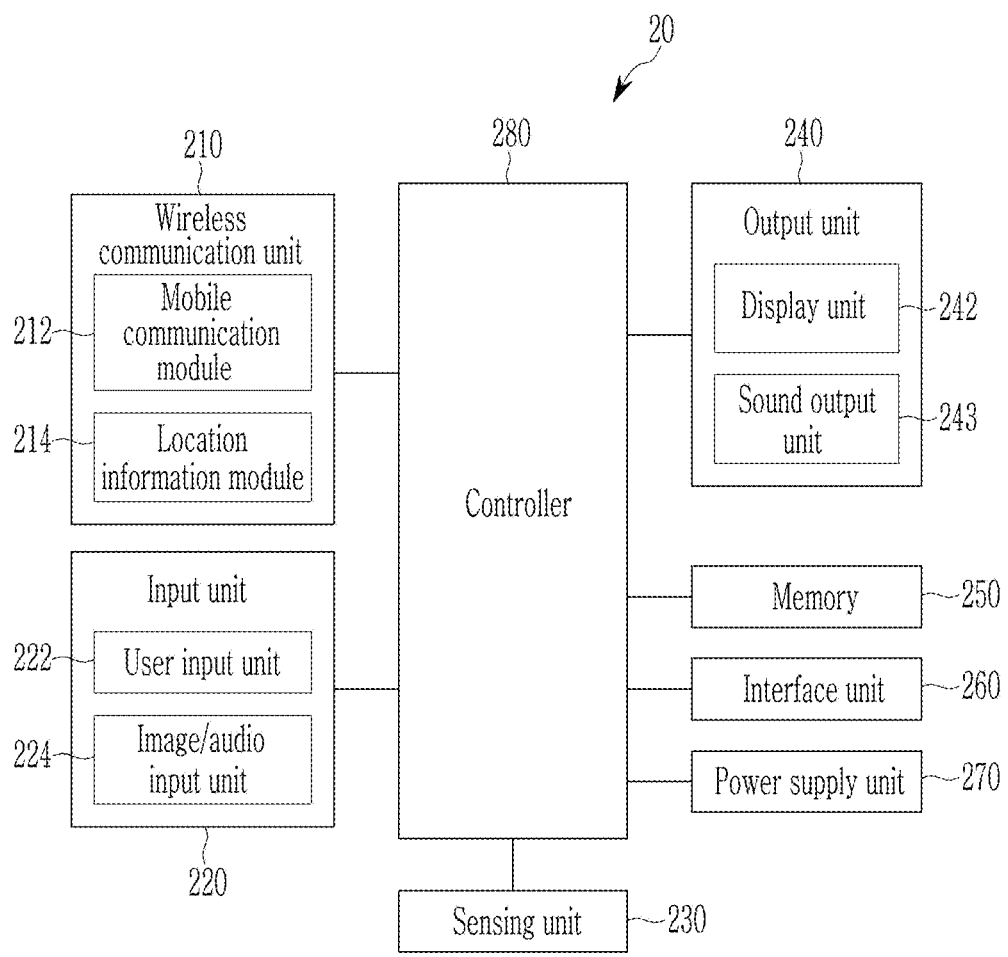
FIG. 3 is a block diagram schematically illustrating a passenger terminal of FIG. 1.

FIG. 3 is a block diagram schematically illustrating the passenger terminal of FIG. 1.

The passenger terminal 20 may include a wireless communication unit 210, an input unit 220, a sensing unit 230, an output unit 240, a memory 250, an interface unit 260, a power supply unit 270, a controller 280, and the like. The constituent elements illustrated in FIG. 3 are not essential for implementing the passenger terminal 20, so the passenger terminal 20 described in the present specification may include more or fewer constituent elements those listed above.

More particularly, the wireless communication unit 210 among the constituent elements may include one or more modules that enable wireless communication between the passenger terminal 20 and a wireless communication system, between the passenger terminal 20 and other wireless communication possible devices 20 and 30, or between the passenger terminal 20 and the server 10.

The wireless communication unit 210 may include a mobile communication module 212, a location information module 214, and the like.

The mobile communication module 212 transceives a wireless signal with at least one of a base station, an external terminal, and the server on the mobile communication network, such as long term evolution (LTE), long term evolution-advanced (LTE-A), 5G (or new radio (NR)), code division multiple access (CDMA), wideband CDMA (WCDMA), or global system for mobile communication (GSM) (not limited thereto). The wireless signal may include an acoustic call signal, a video call signal, or various types of data according to text/multimedia message transception.

The location information module 214 is the module for obtaining a position of the mobile terminal, and a representative example thereof is a global position system (GPS) module. According to the current technology, the GPS module 214 may calculate distance information away from three or more satellites and accurate time information, and then accurately calculate three-dimensional current location information according to latitude, longitude, and altitude by applying trigonometry to the calculated information. Currently, a method of calculating position and time information by using three satellites and correcting an error of the calculated position and time information by using another one satellite has been widely used. Further, the GPS module 214 may calculate speed information by continuously calculating the current location in real time.

Next, the input unit 220 includes a user input unit 222 and an image and/or an audio input unit 224. The user input unit 222 is for the purpose of receiving information from the user, and when the information is input through the user input unit 222, the controller 280 may control an operation of the passenger terminal 20 so as to correspond to the input information.

The user input unit 222 may include a mechanical input means (or a mechanical key, for example, a button positioned on a front surface, a rear surface, or a lateral surface of the passenger terminal 20, a bezel or a crown of the passenger terminal 20, a dome switch, a jog wheel, and a jog switch) and a touch-type input means. For example, the touch-type input means may be implemented with a virtual key, a soft key, or a visual key displayed on a touch screen through software processing, or may be implemented with a touch key disposed in a portion other than the touch screen. In the meantime, the virtual key or the visual key may be displayed on the touch screen with various forms, and for example, the virtual key or the visual key may be implemented by graphic, text, icon, or video, or a combination thereof.

The image/audio input unit 224 may include a camera, a microphone, and the like.

The sensing unit 230 may include one or more sensors for sensing at least one of information about a surrounding environment surrounding the passenger terminal 20 and the information within the passenger terminal 20. For example, the sensing unit 230 may include at least one of an acceleration sensor, an azimuth sensor, a gyroscope sensor, a battery gauge, an infrared sensor, an inclination sensor, a brightness sensor, an altitude sensor, an olfactory sensor, a temperature sensor, a depth sensor, a pressure sensor, a bending sensor, an audio sensor, a video sensor, a grip sensor, and a touch sensor. In the meantime, the passenger terminal 20 disclosed in the present specification may combine information sensed by at least two sensors among the sensors and utilize the combined information.

The sensing unit 230 may collectively refer to the above-described various sensing means. Further, the sensing unit 230 may sense various inputs of the user and an environment of the user and transfer the sensing result so that the controller 280 performs an operation according to the sensing result. The foregoing sensors may be included in the passenger terminal 20 as a separate element, or may be combined into at least one element and included.

The output unit 240 is for generating an output related to sight, hearing, touch, or the like, and may include a display unit 242, a sound output unit 244, a vibration output unit, and the like.

The display unit 242 displays (outputs) the information processed in the passenger terminal 20. For example, the display unit 242 may display execution screen information of the application program driven in the passenger terminal 20 or a user interface (UI) and graphic user interface (GUI) information according to the execution screen information. Two or more display units 242 may also exist according to the implementation form of the passenger terminal 20.

The display unit 242 may include at least one of a liquid crystal display (LCD), a thin film transistor-liquid crystal display (TFT LCD), an organic light-emitting diode (OLED), and an e-ink display.

The sound output unit 244 may output audio data stored in the memory 250 as sound, and may be implemented in the form of a loud speaker outputting various alarm sounds or play sound of multimedia.

In addition, the output unit 240 may also further include a light output unit outputting a signal notifying the generation of an event by using light of a light source.

Further, the memory 250 may store firmware and the application program driven in the passenger terminal 20, and data and commands for the operation of the passenger terminal 20. At least some of the application programs may also exist in the passenger terminal 20 from the time of release for the basic function of the passenger terminal 20. Further, at least some of the application program may be downloaded from an external server through wireless communication. In the meantime, the application program may be stored in the memory 250 and is installed in the passenger terminal 20 to be driven so that the operation (or function) of the passenger terminal 20 is performed by the controller 280.

The interface unit 260 serves as a passage with various types of external devices connected with the passenger terminal 20. The interface unit 260 may include at least one of an external charger port, a wire/wireless data port, and a memory card port. The passenger terminal 20 may perform the appropriate control related to the connected external device in response to the connection of the external device to the interface unit 260.

The power supply unit 270 receives external power and internal power and supplies power to various constituent elements included in the passenger terminal 20 under the control of the controller 280. The power supply unit 270 includes a battery, and the battery may be an embedded battery or a replaceable battery.

In addition to the operation related to the application program, the controller 280 may generally control the general operation of the passenger terminal 20. The controller 280 may process the signal, the data, the information, and the like input or output through the foregoing constituent elements or drive the application program stored in the memory 250 to provide the appropriate information or function to the user or process the appropriate information or function.

Further, the controller 280 may control at least some of the constituent elements described with reference to FIG. 3 in order to drive the application program stored in the memory 250. Further, in order to drive the application program, the controller 280 may combine and operate at least two of the constituent elements included in the passenger terminal 20.

At least two of the constituent elements may operate in cooperation with each other to implement the operation, the control, or the control method of the passenger terminal 20 according to various exemplary embodiments described below. Further, the operation, the control, or the control method of the passenger terminal 20 may be implemented on the passenger terminal 20 for driving at least one application program stored in the memory 250.

The passenger terminal 20 may be applied to various structures, such as a watch type, a clip type, a glasses type, or a slide type in which two or more bodies are combined to be relatively movable, a swing type, and a swivel type. The present disclosure may be related to the specific type of passenger terminal 20, but the description about the specific type of the passenger terminal 20 may be generally applied to another type of passenger terminal 20.

Next, the call service provided by the server 10 to the passenger terminal 20 will be described with reference to FIG. 4.

Figure 4:
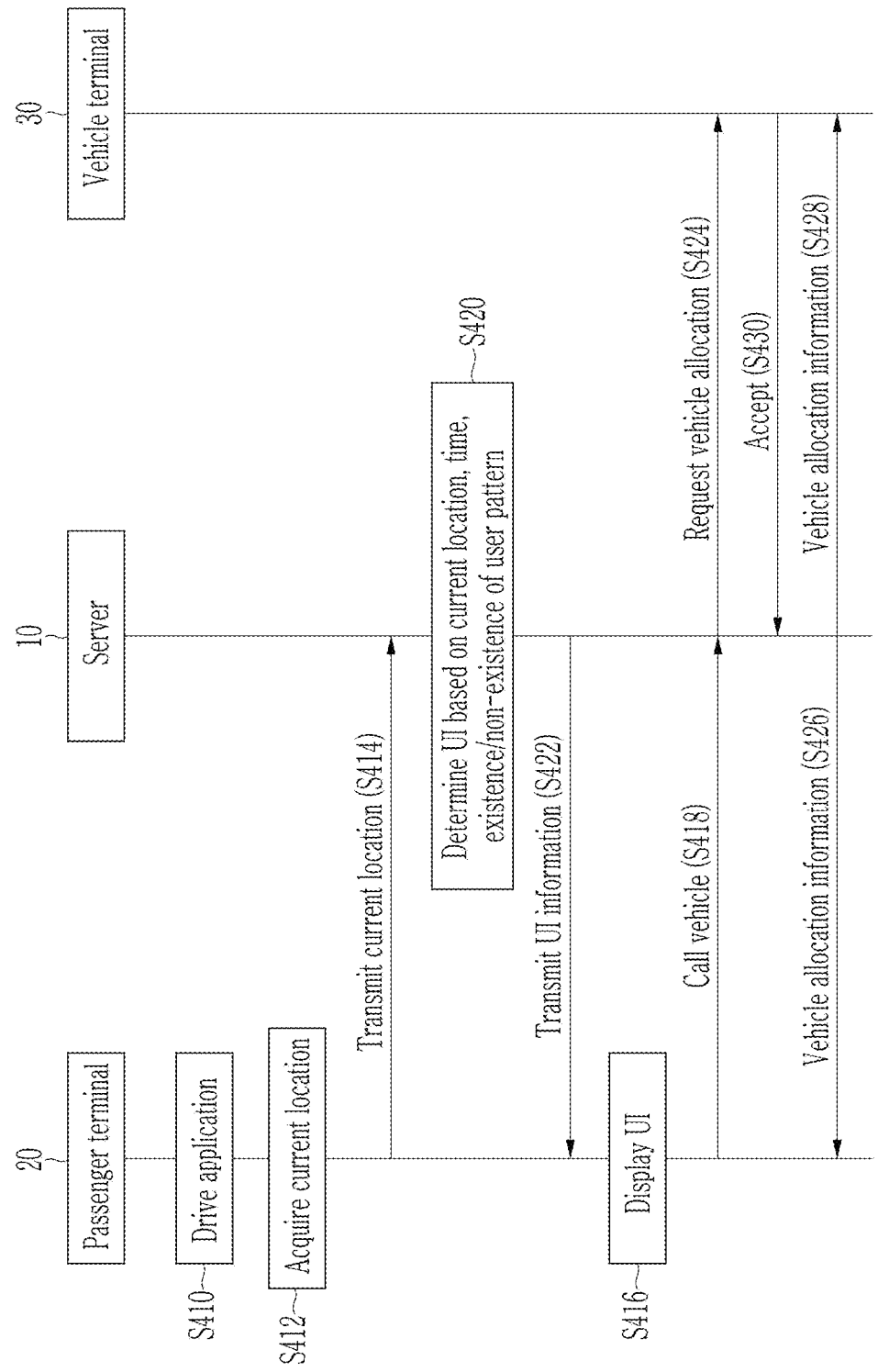
FIG. 4 is a flowchart illustrating a call service providing method according to another embodiment.

FIG. 4 is a flowchart illustrating a call service providing method according to an embodiment.

Referring to FIG. 4, the controller 280 of the passenger terminal 20 drives an application by an input of a user (S410).

The location information module 214 acquires a current location of the passenger terminal 20 (S412). The acquirement of the current location by the location information module 214 may be performed before and after the driving S410 of the application.

The wireless communication unit 210 transmits the current location to the server 10 (S414). For example, the controller 280 transmits the current location to the server 10 through the wireless communication unit 210 after the driving of the application.

The controller 130 of the server 10 determines a UI based on the current location of the passenger terminal 20, a reception time of the current location of the passenger terminal 20, and existence/non-existence of a call pattern corresponding to a user of the passenger terminal 20 (S420).

In the UI for calling a vehicle, a destination may be set in advance, at least one destination may be recommended, and an immediate call function may be exposed, and an emergent call function may be exposed.

Operation S420 is described with reference to FIG. 5.

Figure 5:
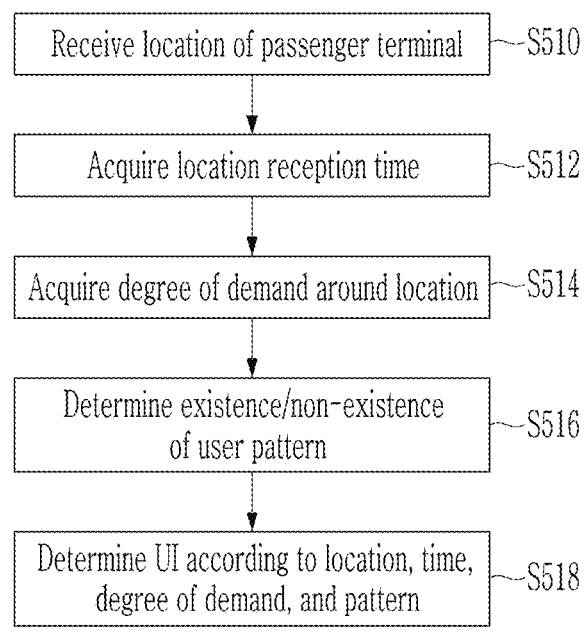
FIG. 5 is a flowchart illustrating some operations of FIG. 4 in detail.

FIG. 5 is a flowchart illustrating some operations of FIG. 4 in detail.

The communication unit 110 of the server 10 receives the current location of the passenger terminal (S510).

The controller 130 acquires time information on a time at which the current location of the passenger terminal 20 is received (S512).

The controller 130 acquires the degree of demand around the current location based on whether there is a call from another passenger terminal around the current location of the passenger terminal 20 (S514).

The controller 130 determines whether there is a call pattern of the user of the passenger terminal 20 in the call pattern database 124 (S516).

The controller 130 determines a UI to be provided to the passenger terminal 20 in consideration of the reception time of the current location of the passenger terminal 20, the degree of demand around the current location, and the call pattern corresponding to the user of the passenger terminal 20 (S518).

FIGS. 6A and 6B are tables respectively representing the UI of the call service providing method according to the embodiment. As illustrated in FIGS. 6A-6B, the controller 130 may determine the UI according to the use location, the use time, the existence/non-existence of the pattern, and the degree of demand.

The controller 130 may determine whether the current location is a main use place. For example, the main use place is an area in which an average value of the number of vehicle calls in the area designated as a departure point among the plurality of areas divided according to a predetermined reference is equal to or larger than an average value of the number of vehicle calls generated in the plurality of areas. That is, according to the accumulation of the vehicle calls, the controller 130 may divide the place in which the vehicle call is frequent and the place in which the vehicle call is not frequent. The controller 130 may divide the place in which the vehicle call is frequent as the main use place.

The controller 130 may determine the time at which the current location is received is a main use time at the current location. For example, the main use time at the current location is the time at which the number of vehicle calls in any one time zone among the plurality of time zones divided according to a predetermined reference at the current location is equal to or larger than an average value of the number of vehicle calls of the plurality of time zones. That is, according to the accumulation of the vehicle calls, the controller 130 may divide the time zone in which the vehicle call is frequent and the time zone in which the vehicle call is not frequent at the current location. The controller 130 may divide the time zone in which the vehicle call is frequent as the main use time.

The controller 130 may determine whether there is the call pattern of the user. For example, the controller 130 determines whether there is the call pattern of the user from the call pattern database 124.

In particular, the controller 130 determines whether there is the call pattern of the user in a place adjacent to the current location based on the moving path pattern information of the call pattern. When there is the call pattern of the user in a place adjacent to the current location based on the moving path pattern information of the call pattern, the controller 130 determines that there is the call pattern, and otherwise, the controller 130 determines that there is no call pattern.

In addition, the controller 130 determines whether there is a call pattern in the case of the same day (weekday/weekend) as the time when the current location is received in the place adjacent to the current location based on the moving path pattern information of the call pattern and the pattern information according to the day of the call pattern.

In one embodiment, the controller 130 may determine whether there is a call pattern in which the pattern information included in the call pattern among the call patterns corresponds to the pattern information determined from the current location and the current time.

Then, the controller 130 may determine a destination mainly used at the current location by referring to the moving path pattern information of the corresponding call pattern.

When there is no call pattern of the user at the current location, the controller 130 may determine a recommended destination by using a call pattern of a similar user. For example, when the call pattern of the user at the current location is not stored in the call pattern database 124, the controller 130 may determine a recommended destination at the current location by referring to a moving path pattern information of a call pattern at the current location of another user similar to the user. The controller 130 may determine another user having the similar call pattern to the call patterns of the user as a similar user, or determine a user having the similar gender, address, age, and the like to those of the user as a similar user.

When there is no call pattern of the user, that is, in the case of a new user, the controller 130 may determine a place at which the call frequency at the current location is highest as a recommended destination.

The controller 130 may determine the degree of demand. For example, when the number of vehicles that can be allocated around the current location is smaller than the number of vehicle calls around the current location, the controller 130 determines that the degree of demand is high. Otherwise, when the number of vehicle calls around the current location is equal to or larger than a predetermined reference number, the controller 130 determines that the degree of demand is high. In particular, when the number of vehicle calls in the current time zone in the area including the current location in the plurality of areas divided according to a predetermined reference is equal to or larger than the number of vehicle calls in the current time zone generated in the plurality of areas, the controller 130 determines that the degree of demand at the current location is high.

Next, referring back to FIG. 4, the communication unit 110 of the server 10 transmits the information about the determined UI to the passenger terminal 20 (S422). For example, the information about the determined UI may include preset destination information, recommended destination information, information on whether each function is exposed, information on expected price when the destination is preset, and the like.

The controller 280 of the passenger terminal 20 displays the UI based on the information about the determined UI on the display unit 242 (S416).

When the user inputs a vehicle call by using the UI displayed on the display unit 242, the wireless communication unit 210 calls the vehicle to the server 10 (S418).

When the vehicle is called in S418, information about the departure point, the destination, a payment method, and the like is transmitted to the server 10.

Then, the server 10 requests the vehicle terminal 30 to allocate the vehicle (S424). In this case, the server 10 may request the vehicle terminal 30 near the departure point at the time of the vehicle call or the current location of the passenger terminal 20 to allocate the vehicle.

Then, the vehicle terminal 30 receiving the request of the vehicle allocation accepts the allocation of the vehicle (S430).

When the vehicle allocation is accepted, the server 10 transmits the vehicle allocation information to each of the passenger terminal 20 and the vehicle terminal 30 (S426 and S428).

FIGS. 7 to 11 are diagrams respectively depicting a screen displayed on the display unit of the passenger terminal according to the call service providing method according to the embodiments of the present disclosure.

Figure 7:
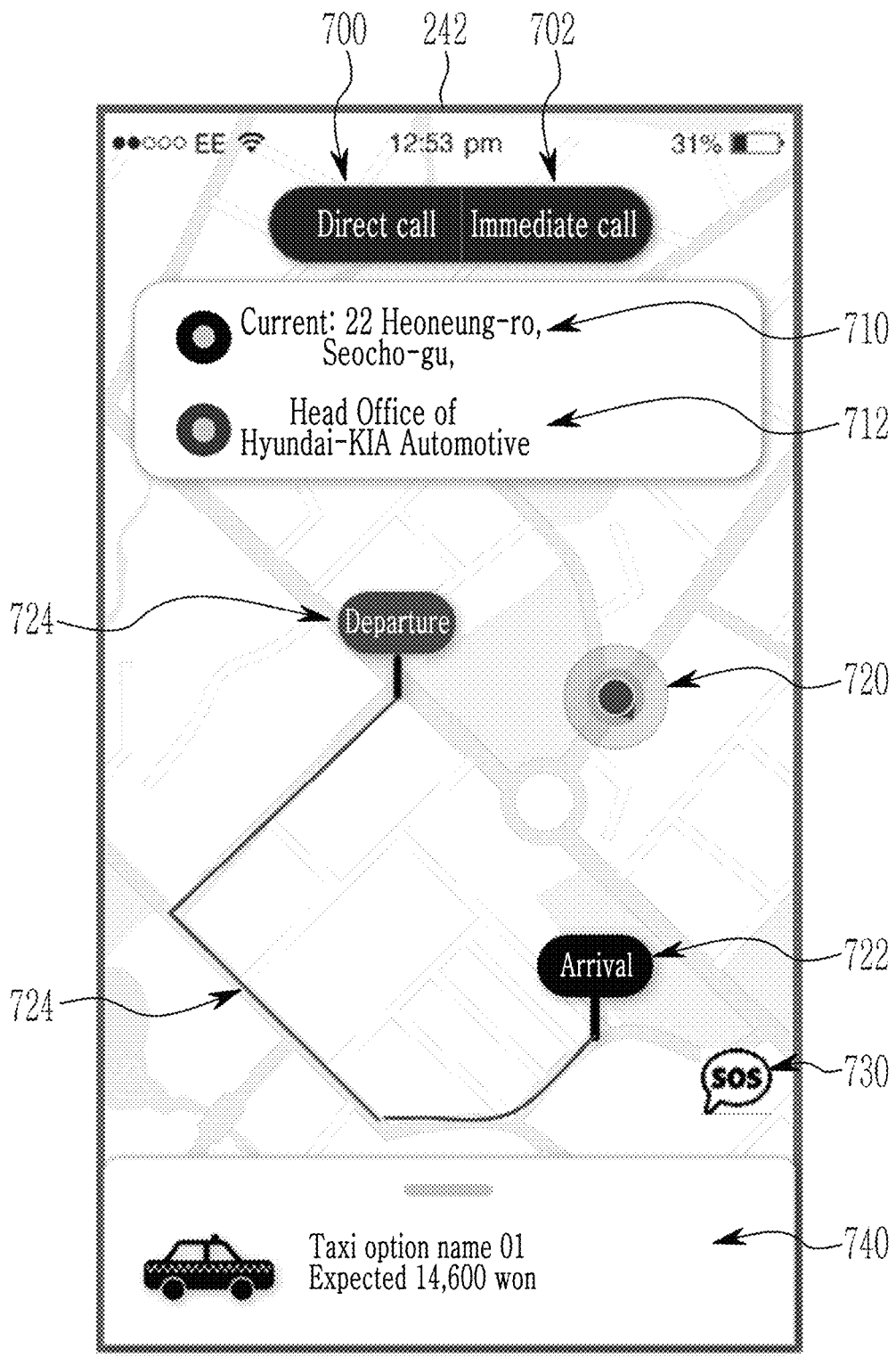
FIGS. 7 to 11 are diagrams depicting screens displayed on a display unit of the passenger terminal according to the call service providing method according to the embodiment of the present disclosure.

Referring to FIG. 7, the display unit 242 displays a call UI (see No. 2 of FIG. 6A) in which a destination is automatically set at the time of the direct call.

The call UI includes an object 700 for directly calling a vehicle by inputting information about a departure point/destination, and an object 702 for immediately calling the vehicle without an input of information about a departure point/destination. Further, the call UI includes a window 710 for inputting information about a departure point and a window 712 for inputting information about a destination. In FIG. 7, the preset departure point and destination are displayed on the windows 710 and 712.

In the call UI, a map interface is displayed, and an object 720 representing a current location of the passenger terminal 20, an object 722 representing a departure point, an object 724 representing a destination, and an indication line 726 representing a route on the map are further displayed.

In the call UI, an object 730 for calling at an emergency situation and information 740 about expected price may be further displayed.

Figure 8:
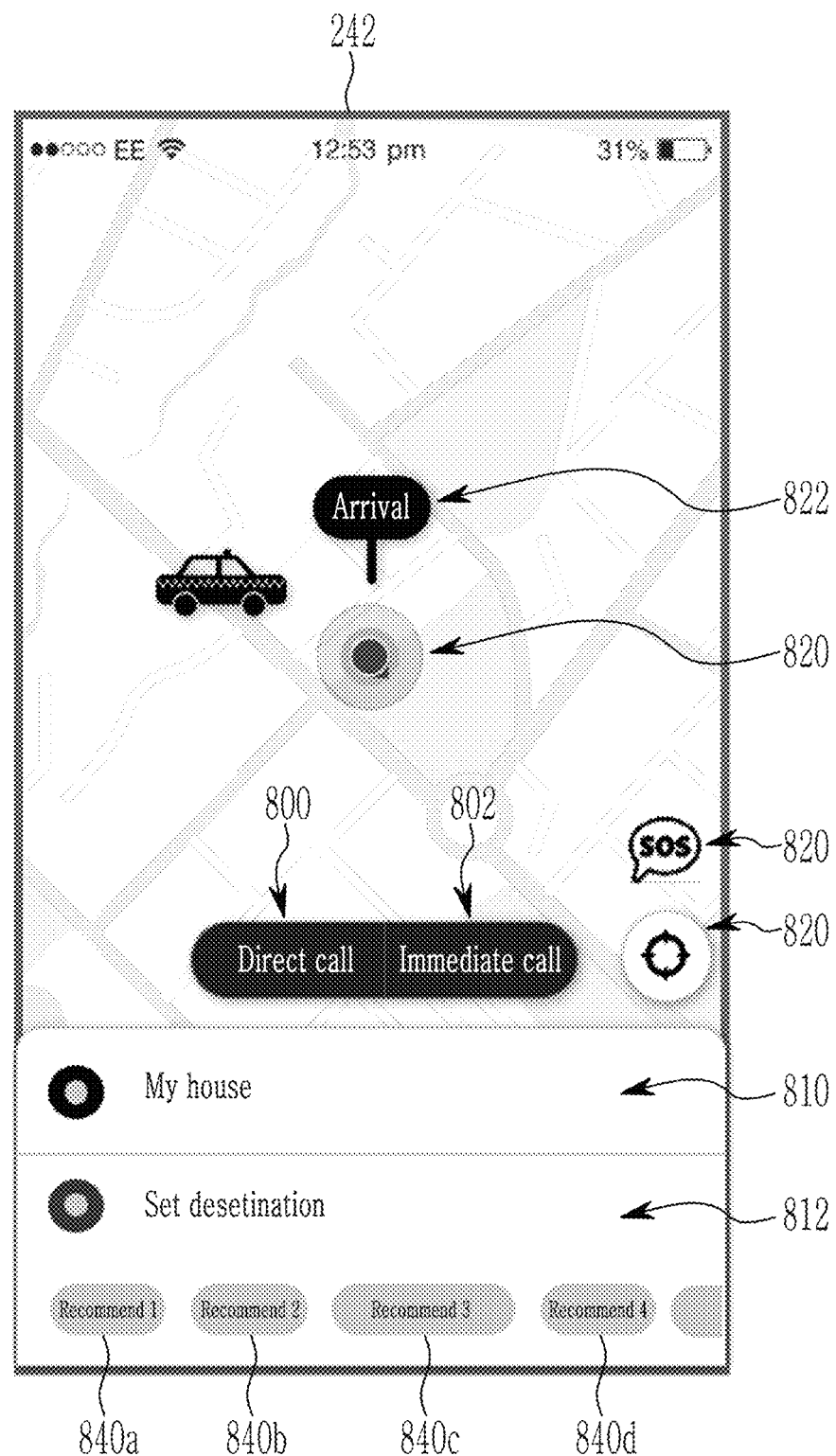

Referring to FIG. 8, the display unit 242 displays call UIs (see Nos. 4, 6, 8, 10, 12, 14, and 16 of FIGS. 6A-6B) recommending the destination at the time of the direct call.

The call UI includes an object 800 for directly calling a vehicle by inputting information about a departure point/destination, and an object 802 for immediately calling a vehicle without an input of information about a departure point/destination. Further, the call UI includes a window 810 for inputting information about a departure point and a window 812 for inputting information about a destination.

In the call UI, a map interface is displayed, and an object 820 representing a current location of the passenger terminal 20 and an object 822 representing a departure point on the map may be further displayed.

In the call UI, an object 830 for calling at an emergency situation and an object 832 for acquiring the current location again may be further displayed.

In the call UI, objects 840a, 840b, 840c, and 840d representing the recommended destinations may be further displayed.

Figure 9:
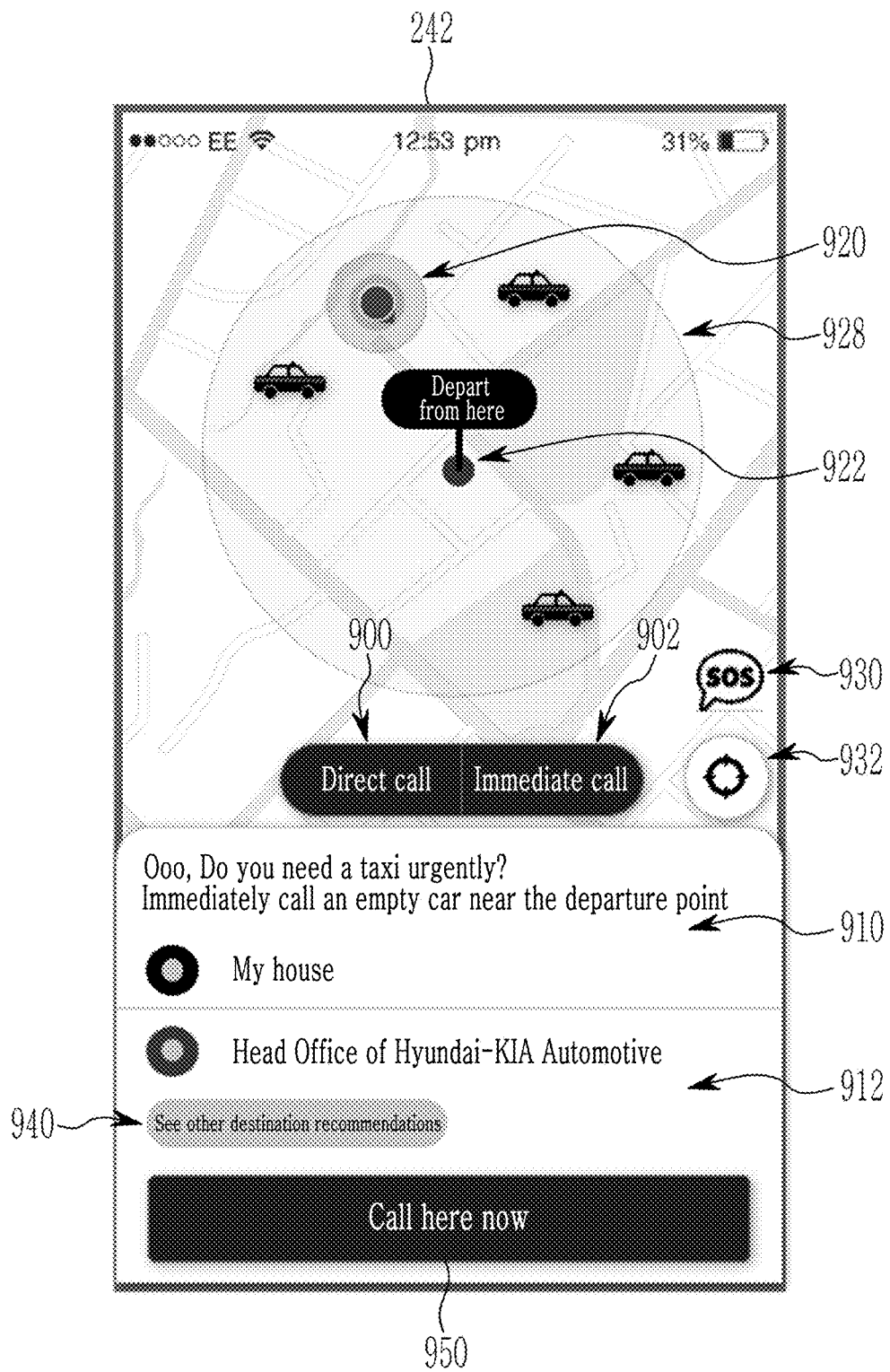

Referring to FIG. 9, the display unit 242 displays a call UI (refer to No. 1 of FIG. 6A) in which a destination is automatically set at the time of the immediate call.

The call UI includes an object 900 for directly calling a vehicle by inputting information about a departure point/destination, and an object 902 for immediately calling a vehicle without an input of information about a departure point/destination. Further, the call UI includes a window 910 for inputting information about a departure point and a window 912 for inputting information about a destination. In FIG. 9, a preset departure point and destination are displayed on the windows 910 and 912.

In the call UI, a map interface is displayed, and an object 920 representing a current location of the passenger terminal 20 and an object 922 representing an expected departure point on the map may be further displayed. The expected departure point may be the departure point frequently set according to the call pattern near the current location. Further, in the call UI, an area 928 in which a vehicle around the expected departure point may be further displayed.

In the call UI, an object 930 for calling at an emergency situation and an object 932 for acquiring the current location again may be further displayed.

In the call UI, an object 940 for further displaying a recommended destination may be further displayed.

In the call UI, an object 950 for immediately calling the vehicle to the set departure point and destination may be displayed. When the object 950 for the immediate call is selected, the passenger terminal 20 immediately calls the vehicle to a place having the highest matching rate among recommended places even without a separate destination input.

Figure 10:
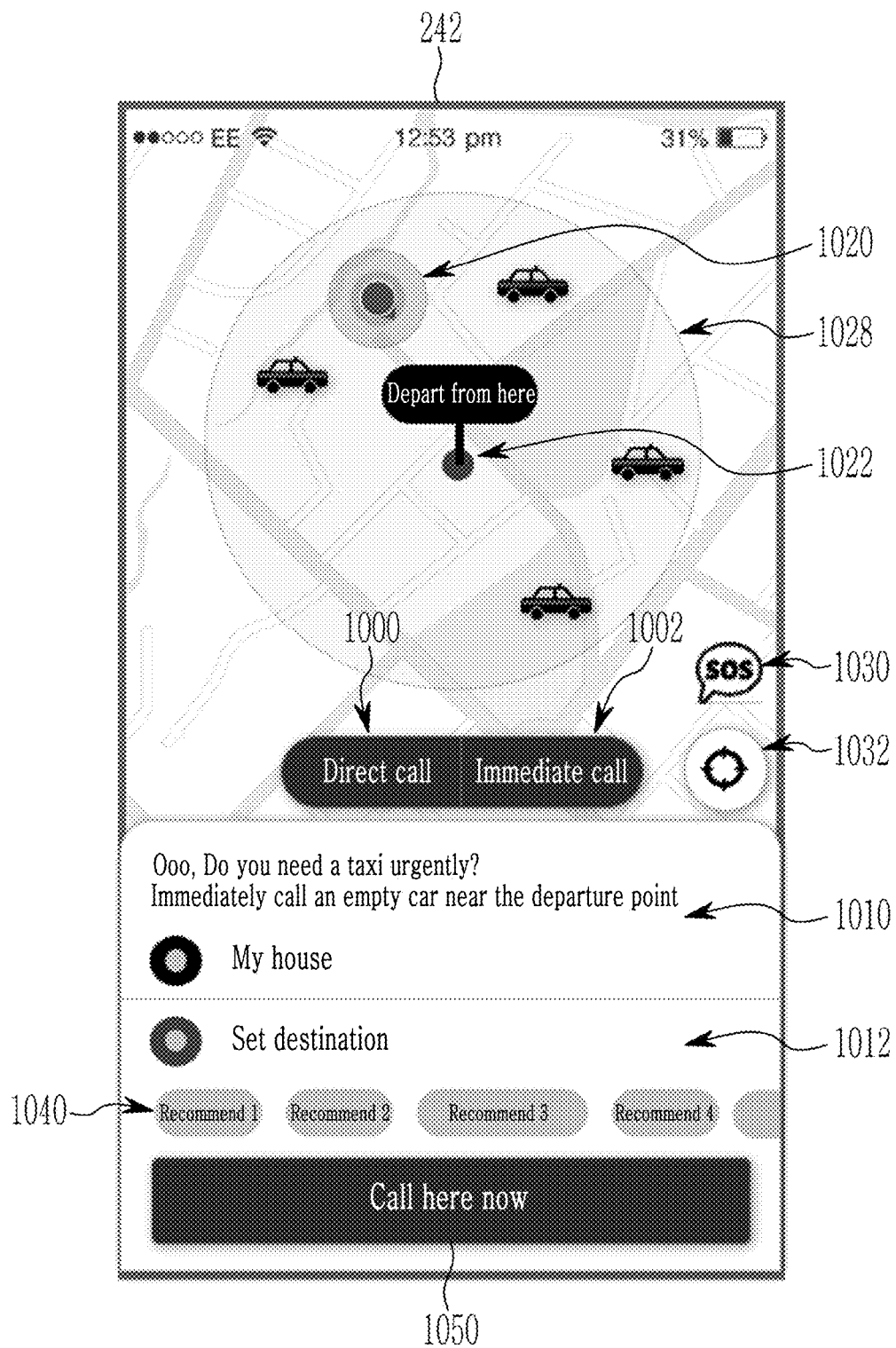

Referring to FIG. 10, the display unit 242 displays call UIs (see Nos. 3, 5, 7, 9, 11, 13, and 15 of FIGS. 6A-6B) recommending the destination at the time of the immediate call.

The call UI includes an object 1000 for directly calling a vehicle by inputting information about a departure point/destination, and an object 1002 for immediately calling a vehicle without an input of information about a departure point/destination. Further, the call UI includes a window 1010 for inputting information about a departure point and a window 1012 for inputting information about a destination.

In the call UI, a map interface is displayed, and an object 1020 representing a current location of the passenger terminal 20 and an object 1022 representing an expected departure point on the map may be further displayed. The expected departure point may be the departure point frequently set according to the call pattern near the current location. Further, in the call UI, an area 1028 in which a vehicle near the expected departure point may be further displayed.

In the call UI, an object 1030 for calling at an emergency situation and an object 1032 for acquiring the current location again may be further displayed.

In the call UI, objects 1040 for representing the recommended destination may be further displayed.

In the call UI, an object 1050 for immediately calling the vehicle to the set departure point and destination may be displayed.

In FIGS. 7 to 10, in the case of the direct call, the vehicle call may proceed only when the destination is determined, but in the case of the immediate call, the vehicle call may proceed by selecting the vehicle call objects 950 and 1050 even though the destination is not determined, which is the difference. In FIG. 7, the destination is preset in the case of the direct call, but the vehicle call may proceed after the preset destination is confirmed by the user.

Figure 11:
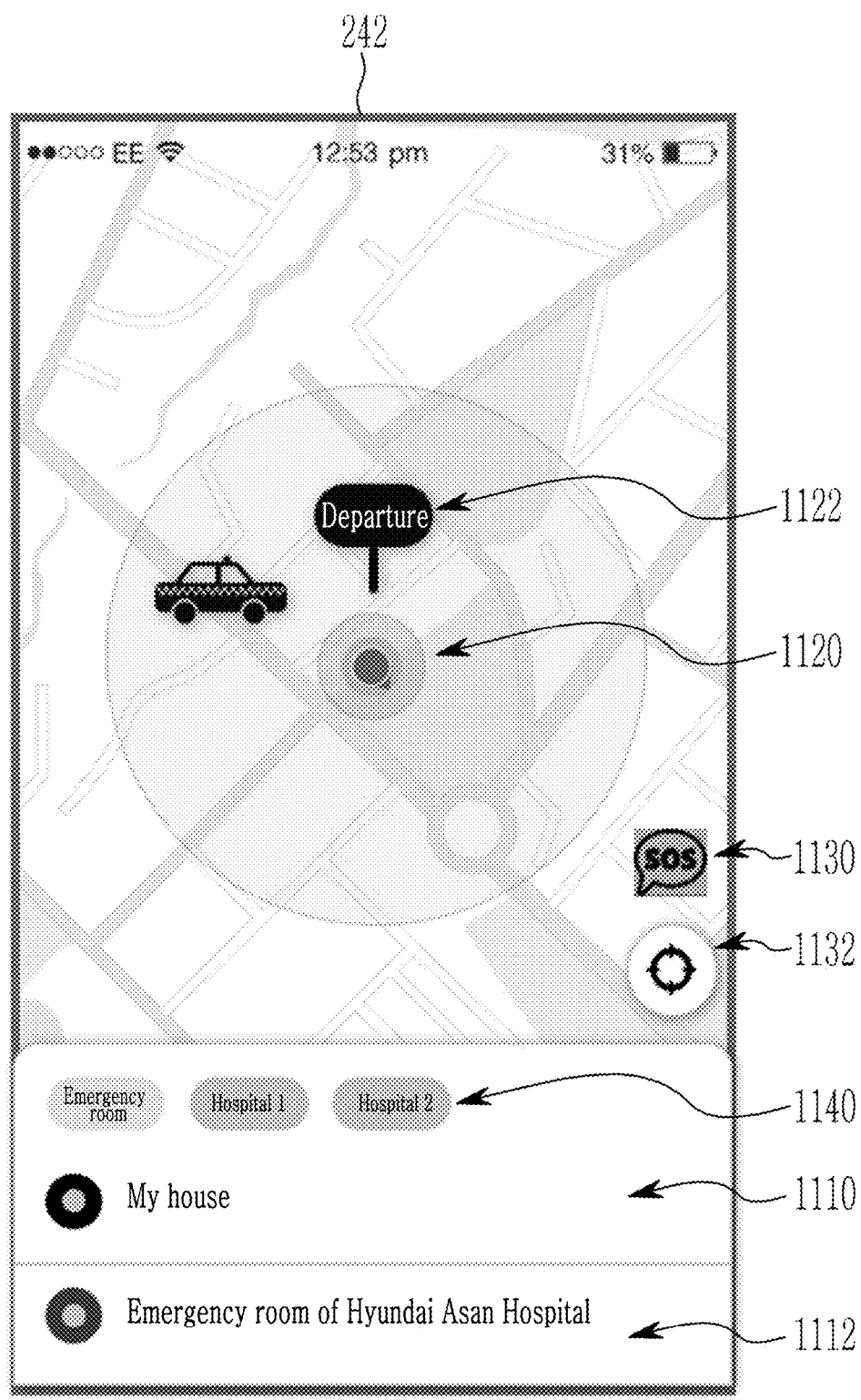

Referring to FIG. 11, the display unit 242 displays an emergency call UI (refer to No. 17 of FIG. 6B).

When the objects 730, 830, 930, and 1030 for calling the vehicle in the case of the emergency situation displayed in the call UIs of FIGS. 7 to 10 are selected, the emergency call UI of FIG. 11 may be displayed.

The emergency call UI includes a window 1110 for inputting information about a departure point and a window 1112 for inputting information about a destination. In FIG. 11, a preset departure point and emergency destination are displayed on the windows 1110 and 1112. The emergency destination may be preset by the user, or may be automatically set to a hospital having an emergency room around the departure point.

In the emergency call UI, a map interface is displayed, and an object 1120 representing a current location of the passenger terminal 20 and an object 1122 representing an expected departure point on the map may be further displayed.

In the emergency call UI, an object 1130 for cancelling the emergency call and an object 1132 for acquiring the current location again may be further displayed.

In the emergency UI, objects 1140 for representing a recommended emergency destination may be further displayed.

As described above, according to the present disclosure, the golfer may grasp information about the green in detail, and accurately grasp the distance between the boll and the pin, height difference, and a path by conveniently setting the position of the ball and the position of the pin.

According to at least one of the exemplary embodiments of the present disclosure, there is an advantage in that a user can call a taxi quickly due to the immediate call function, and it is possible to prevent a business vehicle from refusing to take passengers.

According to at least one of the embodiments of the present disclosure, there is an advantage in that a user may be assigned a taxi quickly and a user is capable of conveniently using the transportation service.

The various exemplary embodiments of the present document and the terms used therein are not intended to limit the technical features described in this document to specific exemplary embodiments, and it should be understood to include various modifications, equivalents, or substitutions of the corresponding exemplary embodiment. In connection with the description of the drawings, like reference numerals may be used for similar or related constituent elements. The singular form of the noun corresponding to the item may include one or more of the item, unless the relevant context clearly dictates otherwise. In the present document, each of the terms, such as "A or B", "at least one of A and B", "at least one of A or B", "A, B, or C", "at least one of A, B, and C", and "at least one of A, B, or C", may include all possible combinations of items listed together in the corresponding one of the phrases. Terms, such as "first", "second", or "first" or "second" may simply be used to distinguish the corresponding constituent element from other corresponding constituent elements, and do not limit the corresponding constituent elements in another aspect (for example, importance or order). When it is referred that one (for example, a first) constituent element is "coupled" or "connected" to another constituent element (for example, a second) with or without the terms "functionally" or "communicatively", it means that the one constituent element can be connected to the another constituent element directly (for example, by wire), wirelessly, or through a third constituent element.

As used herein, the terms "module" and "unit" may include a unit implemented in hardware, software, or firmware, and are for example, interchangeable with terms, such as logic, logical block, component, or circuit. The module and the unit may be an integrally formed part or a minimum unit or a part of the part that performs one or more functions. For example, according to the exemplary embodiment, the module may be implemented in the form of an application-specific integrated circuit (ASIC).

Various exemplary embodiments of the present document may be implemented as software (for example, a program) including one or more commands stored in a storage medium (for example, an internal memory or an external memory) readable by a machine (for example, a server). For example, a processor of the machine (for example, a server) may call at least one command among one or more stored commands from the storage medium and execute the called command. This makes it possible for the device to be operated to perform at least one function in accordance with the called at least one command. The one or more commands may include a code generated by a compiler or a code executable by an interpreter. The machine-readable storage medium may be provided in the form of a non-transitory storage medium. Herein, the "non-transitory" only means that the storage medium is a tangible device and does not include a signal (for example, electromagnetic wave), and this terms does not discriminate the case where data is semi-permanently stored in the storage medium and the case where data is temporarily stored.

According to the exemplary embodiment, the method according to various exemplary embodiments disclosed in the present document may be included in a computer program product and provided. The computer program product may be traded between sellers and buyers as commodities. The computer program product may be distributed in the form of a machine-readable storage medium (for example, a compact disc read only memory (CD-ROM), or may be directly and on-line distributed (for example, downloaded or uploaded) through two user devices (for example, smart phones) through an application store (for example, a play store). In the case of the on-line distribution, at least some of the computer program products may be at least temporarily stored or temporarily generate in a machine-readable storage medium, such as a memory, of a server of a manufacturing company, a server of an application store, or a relay server.

According to various exemplary embodiments, each (for example, the module or the program) of the foregoing constituent elements may include single or plural objects. According to various exemplary embodiments, among the corresponding constituent elements, one or more constituent elements or operations may be omitted or one or more other constituent elements or operations may be added. Alternatively or additionally, the plurality of constituent elements (for example, a module or a program) may be implemented into one constituent element. In this case, the combined constituent element may perform one or more functions of each of the plurality of constituent elements identically or similarly to those performed by the corresponding constituent element among the plurality of constituent elements prior to the integration. According to various exemplary embodiments, operations performed by a module, program, or other constituent elements may be executed sequentially, in parallel, repeatedly, or heuristically, or one or more of the operations may be executed in a different order or omitted, or one or more other operations may be added.

While this present disclosure has been described in connection with what is presently considered to be practical exemplary embodiments, it is to be understood that the present disclosure is not limited to the disclosed embodiments.

While this present disclosure has been described in connection with what is presently considered to be practical exemplary embodiments, it is to be understood that the present disclosure is not limited to the disclosed embodiments. On the contrary, it is intended to cover various modifications and equivalent arrangements included within the spirit and scope of the present disclosure.

What is claimed is:

1. A method of providing a call service, the method comprising:
   receiving a current location of a first terminal from the first terminal;
   acquiring information on a time at which the current location is received;
   acquiring a degree of demand of a vehicle call around the current location;
   determining whether a call pattern of a user corresponding to the first terminal is stored;
   determining a vehicle call UI displayed in the first terminal according to the current location, the time, the degree of demand, and existence/non-existence of the call pattern of the user corresponding to the first terminal; and
   transmitting information about the vehicle call UI to the first terminal.

2. The method of claim 1, wherein:
   the determining of the vehicle call UI includes:
   when the call pattern of the user is stored, the current location is a main use place in which a vehicle call is frequent, the time is a main use time at which the vehicle call is frequent, and the degree of demand is high, determining the vehicle call UI as an immediate call UI in which a mainly used destination of the call pattern is preset as a destination and which includes an object that immediately calls the vehicle.

3. The method of claim 1, wherein:
   the determining of the vehicle call UI includes:
   when the call pattern of the user is stored, the current location is a main use place in which a vehicle call is frequent, the time is a main use time at which the vehicle call is frequent, and the degree of demand is low, determining the vehicle call UI as a direct call UI in which a mainly used destination of the call pattern is preset as a destination.

4. The method of claim 1, wherein:
   the determining of the vehicle call UI includes:
   when the call pattern of the user is stored and the degree of demand is high, determining the vehicle call UI as an immediate call UI which recommends a mainly used destination of the call pattern as a destination and includes an object immediately calling a vehicle.

5. The method of claim 1, wherein:
   the determining of the vehicle call UI includes:
   when the call pattern of the user is not stored and the degree of demand is high, determining the vehicle call UI as an immediate call UI which recommends a mainly used destination of a call pattern of another user similar to the user as a destination and includes an object immediately calling a vehicle.

6. The method of claim 1, wherein:
   the determining of the vehicle call UI includes:
   when the call pattern of the user is stored and the degree of demand is low, determining the vehicle call UI as a direct call UI which recommends a mainly used destination of the call pattern as a destination.

7. The method of claim 1, wherein:
   the determining of the vehicle call UI includes:
   when the call pattern of the user is not stored and the degree of demand is low, determining the vehicle call UI as a direct call UI which recommends a mainly used destination of a call pattern of another user similar to the user as a destination.

8. The method of claim 1, further comprising:
   receiving a vehicle call according to an input in the vehicle call UI from the first terminal; and
   requesting allocation of a vehicle according to the vehicle call to at least one second terminal located around the current location.

9. The method of claim 8, wherein:
   the call pattern includes at least one of pattern information according to a day, pattern information according to weather, movement distance pattern information, pattern information according to a type of call place, pattern information according to a call environment, or moving path pattern information determined based on the vehicle call.

10. A server, comprising:
    a communication unit;
    a database configured to store a plurality of call patterns corresponding to a plurality of users; and
    a controller configured to:
    receive a current location of a first terminal from the first terminal through the communication unit,
    acquire information on a time at which the current location is received,
    acquire a degree of demand of a vehicle call around the current location,
    determine whether a call pattern of a user corresponding to the first terminal is stored in the database, and
    determine a vehicle call UI as an immediate call UI or a direct call UI according to the current location, the time, a degree of demand, and existence/non-existence of the call pattern of the user corresponding to the first terminal.

11. The server of claim 10, wherein:
    when the call pattern of the user is stored in the database, the current location is a main use place in which a vehicle call is frequent, the time is a main use time at which the vehicle call is frequent, and the degree of demand is high, the controller is configured to determine the vehicle call UI as an immediate call UI in which a mainly used destination of the call pattern is preset as a destination and which includes an object that immediately calls the vehicle.

12. The server of claim 10, wherein:
    when the call pattern of the user is stored in the database, the current location is a main use place in which a vehicle call is frequent, the time is a main use time at which the vehicle call is frequent, and the degree of demand is low, the controller is configured to determine the vehicle call UI as a direct call UI in which a mainly used destination of the call pattern is preset as a destination.

13. The server of claim 10, wherein:
    when the call pattern of the user is stored in the database and the degree of demand is high, the controller is configured to determine the vehicle call UI as an immediate call UI which recommends a mainly used destination of the call pattern as a destination and includes an object immediately calling a vehicle.

14. The server of claim 10, wherein:
when the call pattern of the user is not stored in the database and the degree of demand is high, the controller is configured to determine the vehicle call UI as an immediate call UI which recommends a mainly used destination of a call pattern of another user similar to the user as a destination and includes an object immediately calling a vehicle.

15. The server of claim 10, wherein:
when the call pattern of the user is stored in the database and the degree of demand is low, the controller is configured to determine the vehicle call UI as a direct call UI which recommends a mainly used destination of the call pattern as a destination.

16. The server of claim 10, wherein:
when the call pattern of the user is not stored in the database and the degree of demand is low, the controller is configured to determine the vehicle call UI as a direct call UI which recommends a mainly used destination of a call pattern of another user similar to the user as a destination.

17. The server of claim 10, wherein:
the controller is further configured to: receive a vehicle call according to an input in the vehicle call UI from the first terminal through the communication unit, and request allocation of a vehicle according to the vehicle call to at least one second terminal located around the current location.

18. The server of claim 17, wherein:
the call pattern includes at least one of pattern information according to a day, pattern information according to weather, movement distance pattern information, pattern information according to a type of call place, pattern information according to a call environment, or moving path pattern information determined based on the vehicle call.

19. A program stored in a non-transitory computer-readable recording medium so as to perform the method according to claim 1.

20. A non-transitory computer-readable recording medium having a program recorded thereon, the program to direct a processor to perform acts of:
receiving a current location of a first terminal from the first terminal;
acquiring information on a time at which the current location is received;
acquiring a degree of demand of a vehicle call around the current location;
determining whether a call pattern of a user corresponding to the first terminal is stored;
determining a vehicle call UI displayed in the first terminal according to the current location, the time, the degree of demand, and existence/non-existence of the call pattern of the user corresponding to the first terminal; and
transmitting information about the vehicle call UI to the first terminal.

* * * * *